(12) United States Patent
Kotab

(10) Patent No.: US 9,351,334 B1
(45) Date of Patent: May 24, 2016

(54) TWO-SIDED DUAL SCREEN MOBILE PHONE DEVICE

(71) Applicant: Dominic M. Kotab, San Jose, CA (US)

(72) Inventor: Dominic M. Kotab, San Jose, CA (US)

( * ) Notice: Subject to any disclaimer, the term of this patent is extended or adjusted under 35 U.S.C. 154(b) by 0 days.

(21) Appl. No.: 14/453,540

(22) Filed: Aug. 6, 2014

Related U.S. Application Data

(63) Continuation of application No. 12/697,992, filed on Feb. 1, 2010, now Pat. No. 8,831,687.

(60) Provisional application No. 61/149,248, filed on Feb. 2, 2009.

(51) Int. Cl.
*H04W 88/02* (2009.01)

(52) U.S. Cl.
CPC ..................... *H04W 88/02* (2013.01)

(58) Field of Classification Search
CPC .......... G06F 1/1647; H04M 2250/16
USPC ......................................... 455/566
See application file for complete search history.

(56) References Cited

U.S. PATENT DOCUMENTS

2002/0080132 A1* 6/2002 Dai et al. ...................... 345/212

* cited by examiner

*Primary Examiner* — David Bilodeau
(74) *Attorney, Agent, or Firm* — Zilka-Kotab, PC

(57) ABSTRACT

According to one embodiment, a mobile phone device includes a generally rectangular-shaped enclosure, the enclosure including a first side on an opposite side of the enclosure from a second side. The first side has a first display that occupies between about 60 percent and about 100 percent of the first side, and the second side has a keypad and a second display. In another embodiment, a method includes outputting data on a first display of a mobile phone device, wherein the first display occupies between about 60 percent and about 100 percent of the first side, detecting a reorientation of the mobile phone, and outputting data on a second display on a second side of the mobile phone device, wherein the first side is opposite the second side, wherein the second side includes a keypad and the second display. Other embodiments are disclosed as well.

18 Claims, 4 Drawing Sheets

TWO-SIDED DUAL SCREEN MOBILE PHONE DEVICE

RELATED APPLICATIONS

This application is a continuation of Ser. No. 12/697,992, filed Feb. 1, 2010 which in turn, claims priority to U.S. provisional application No. 61/149,248, filed Feb. 2, 2009, both of which are herein incorporated by reference.

FIELD OF THE INVENTION

The present invention relates to a two-sided dual screen mobile phone device for data and voice communications.

BACKGROUND

Current mobile phone devices, such as mobile phones, Blackberry® devices, PALM® devices, etc., have been produced in many different forms and formats. One of the more popular formats today includes a full touchscreen display. Another format includes a liquid crystal display (LCD) with a full keypad for text entry. The problem that arises in using these devices depends on the type of device.

The touchscreen devices have large, easily viewable screens, but text entry on these devices is greatly encumbered by the touchscreen entry method, which does not provide tactile selection or feedback when the letters are pressed on the screen, resulting in less efficient text entry. Moreover, the touchscreen device is more likely to misidentify the desired key, often resulting in selection of an adjacent letter or number than the one intended.

The devices which include an LCD display with a full keypad for data entry typically include smaller screens which are not as easy to see, especially when viewing or manipulating websites, text documents, etc. Although text entry is easier with this type of keypad, the limits of the smaller screen also makes this solution not fully appealing. Moreover, costs and the small screen size have prohibited use of a touchscreen instead of an LCD screen on such devices.

To accommodate the above discussed problems, some manufacturers have produced mobile phone devices which include flip-up, slide-out, springing, or otherwise moveable screens and/or keypads so that a larger screen can be included with a full keypad for text entry. However, these solutions present another problem, in that adding more moving parts reduces reliability and introduces additional chance of breakage. In fact, these types of devices typically have shorter useful lifetimes than devices which are designed as "stick" units, e.g., there are no external moving parts other than user input devices. Moreover, the additional complexity has been frowned upon due to the increased costs of such features. Additionally, the form factor of such devices typically is required to be quite thick to enclose all of the hardware.

Therefore, a solution which can provide a large, easy to read screen along with a full keypad for easier text entry while maintaining a small form factor that fits easily into clothing pockets would be greatly beneficial.

SUMMARY

According to one embodiment, a mobile phone device includes a generally rectangular-shaped enclosure, the enclosure including a first side on an opposite side of the enclosure from a second side. The first side has a first display that occupies between about 60 percent and about 100 percent of the first side, and the second side has a keypad and a second display.

In another embodiment, a method includes outputting data on a first display of a mobile phone device, wherein the first display occupies between about 60 percent and about 100 percent of the first side, detecting a reorientation of the mobile phone, and outputting data on a second display on a second side of the mobile phone device, wherein the first side is opposite the second side, wherein the second side includes a keypad and the second display.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as illustrative modes of use, reference should be made to the following detailed description read in conjunction with the accompanying drawings.

Various embodiments of the present invention are described in further detail below with reference to the figures, in which like items are numbered the same in the several figures.

DETAILED DESCRIPTION

The following paragraphs describe certain features and combinations of features that can be used in connection with each of the methods of the invention and embodiments, as generally described below. Also, particular features described hereinafter can be used in combination with other described features in each of the various possible combinations and permutations. As such, the invention is not limited to the specifically described embodiments.

Unless otherwise specifically defined herein, all terms are to be given their broadest possible interpretation and scope including one or more meanings implied from the specification as well as one or more meanings understood by those skilled in the art and/or as defined in dictionaries, treatises, etc.

The following description is made for the purpose of illustrating the general principles of the present invention and is not meant to limit the inventive concepts claimed herein. Further, particular features described herein can be used in combination with other described features in each of the various possible combinations and permutations.

It must also be noted that, as used in the specification and the appended claims, the singular forms "a," "an" and "the" include plural referents unless otherwise specified.

According to one general embodiment, a mobile phone device includes a generally rectangular-shaped enclosure comprising: a first side, including a first display, wherein the first display occupies between about 60 percent and about 100 percent of the first side; and a second side, including a keypad; and a second display; wherein the first side is opposite the second side of the enclosure.

In another general embodiment, a method includes outputting data on a first display of a mobile phone device, wherein the first display occupies between about 60 percent and about 100 percent of the first side, detecting a reorientation of the mobile phone, and outputting data on a second display on a second side of the mobile phone device, wherein the first side is opposite the second side, wherein the second side includes a keypad and the second display.

Figure 1A:
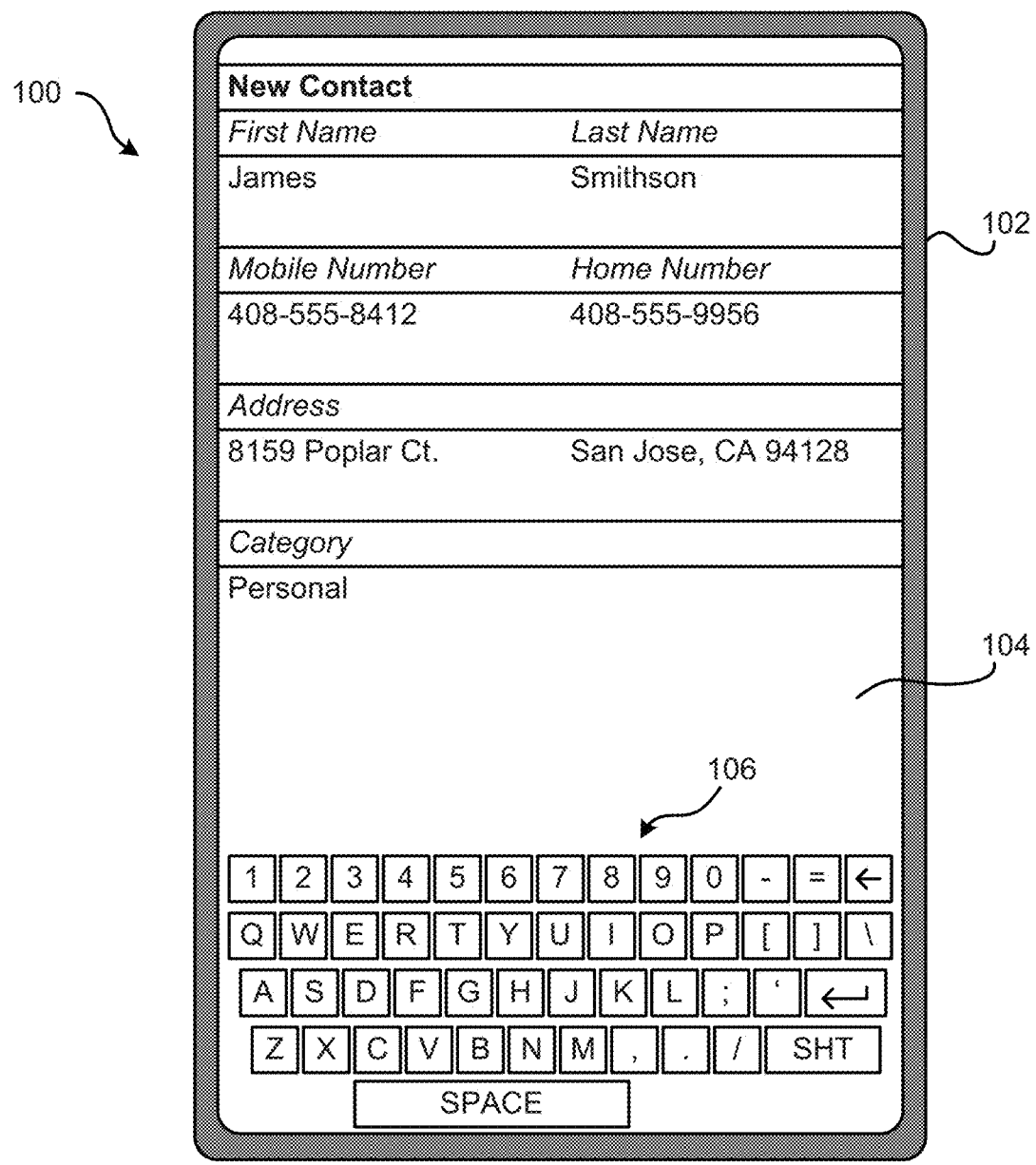
FIG. 1A depicts a first side of a mobile phone device according to one embodiment.
Figure 1B:
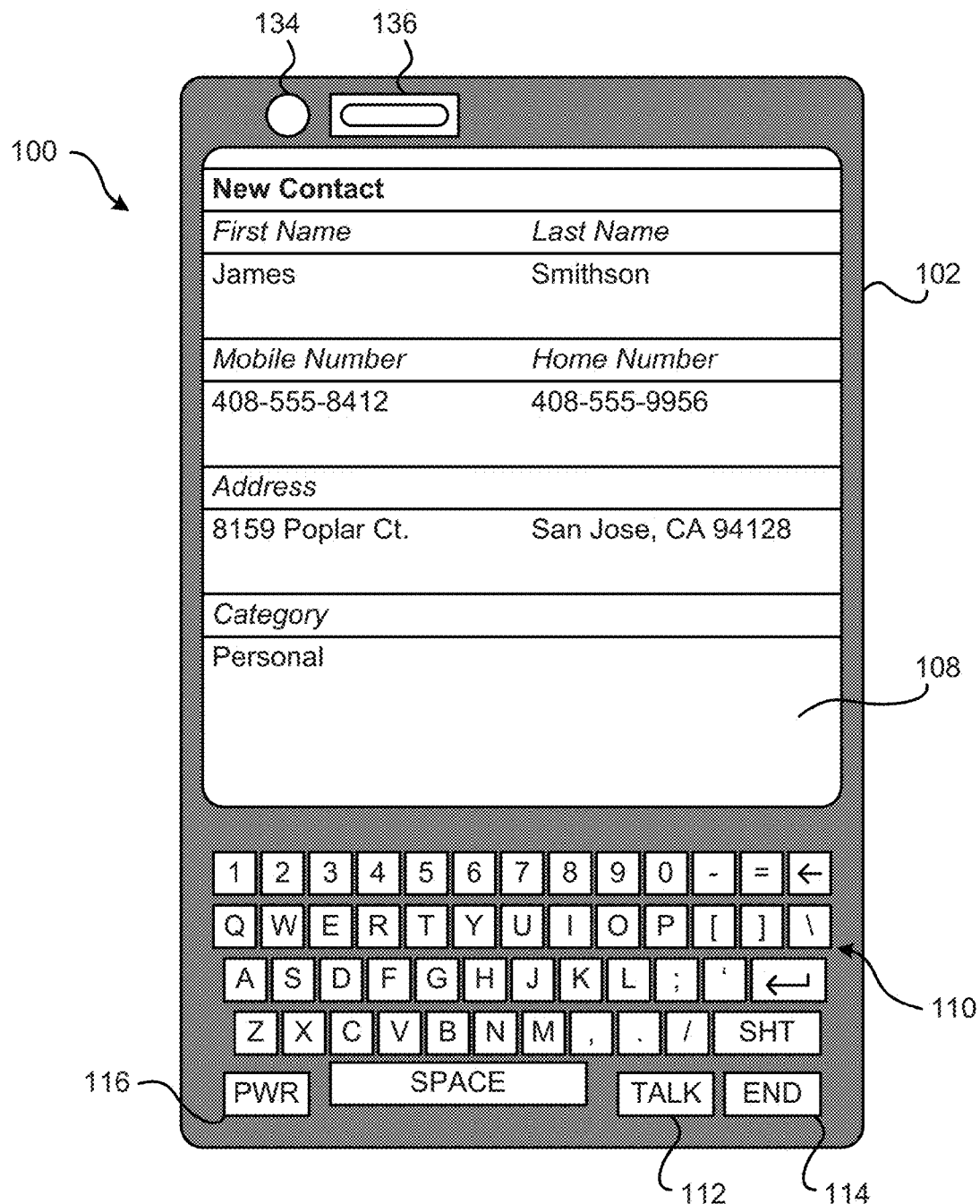
FIG. 1B depicts a second side of a mobile phone device according to one embodiment.
Figure 1C:
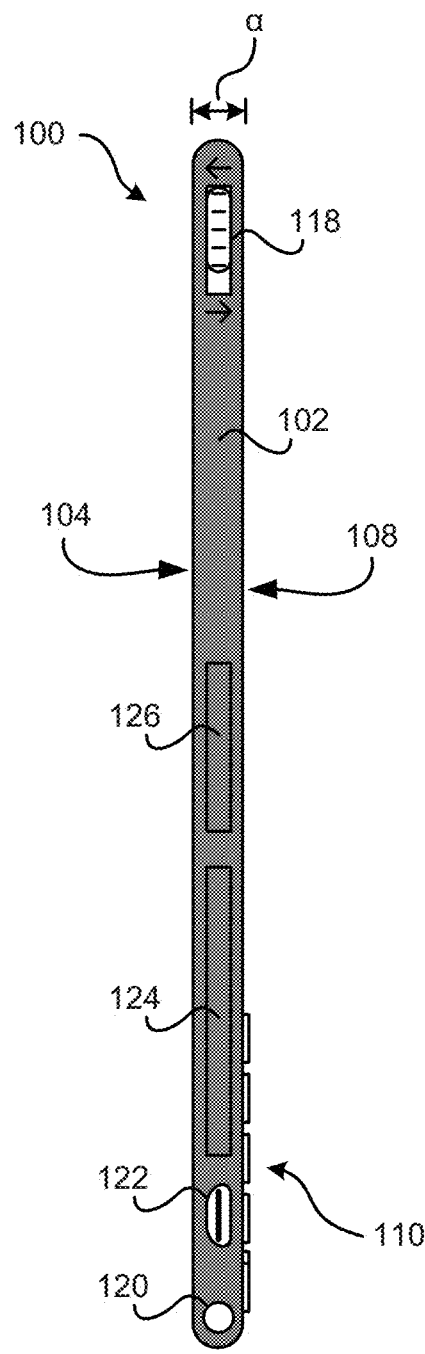
FIG. 1C depicts a left side of a mobile phone device according to one embodiment.

Now referring to FIGS. 1A-1C, a mobile phone device 100 is shown according to one embodiment. The mobile phone device 100 may include more or less features than those shown and/or described, and may be arranged in a different layout than is shown in FIGS. 1A-1C. The general shape and layout of the mobile phone device 100 as shown in FIGS. 1A-IC is provided by way of example only and is not meant to be limiting in any way.

With reference to FIG. 1A, a front side view of a mobile phone device 100 is shown according to one embodiment. Generally, the enclosure 102 of the mobile phone device 100 is rectangular-shaped with sharp or rounded corners. However, the invention is not limited to rectangular-shaped enclosures, as circular, oval, and nonsymmetrical shapes may also be used in various embodiments of the invention. In addition, many enclosures provide uneven shapes, bumps, and protrusions depending on the equipment, electronics, and functionality of the mobile phone device. Therefore, any shaped enclosure which is capable of having two large area sides may be used in various embodiments of the invention.

According to some embodiments, the enclosure 102 may be comprised of any rigid or semi-rigid material, such as plastic, thermo-plastic, metal, carbon fiber, polycarbonate, etc., such that the enclosure has the strength and rigidity to withstand day-to-day use of the mobile phone device 100, and not be prone to premature cracking, fatiguing, breaking, permanent bending, etc., of the displays, buttons, input devices, enclosure, etc.

The mobile phone device 100 may include a first display 104 on a first side of an enclosure 102. The first display 104 occupies between about 60% and about 100% of the first side of the enclosure 102. Preferably, the first display 104 occupies more than about 75% of the first side of the enclosure 102, more preferably the first display 104 occupies more than about 85% of the first side of the enclosure 102, even more preferably, the first display 104 occupies more than about 95% of the first side of the enclosure 102. For example, if the first side of the enclosure 102 has about 9 square inches of area, the first display 104 may occupy about 7.5 square inches of area on the first side of the enclosure 102.

According to some embodiments, the first display 104 may be a touchscreen display. A touchscreen display may be able to detect pressure, contact, heat, changes in surface electrochemistry of the display, or any other touchscreen methodology as would be known to one of skill in the art. Also, the touchscreen display may be able to discern two or more contact points at any given time, along with any movement of the two or more contact points simultaneously. In addition, the first display 104 may be comprised of more than one smaller display, wherein one or more of the smaller displays may be touchscreen displays. Thus, in one illustrative embodiment, a portion of the first display 104 may comprise a touchscreen while another portion is not a touchscreen. Moreover, one or more smaller displays may combine to form the first display, such as a composite display.

According to one embodiment, the first display 104 may show a virtual keypad 106 on the first display 104 when text is to be entered. In this fashion, a user may touch a representation of a key indicating a letter, symbol, number, etc., to be entered as text. When the mobile phone device 100 is not in text entry mode, the virtual keypad 106 may no longer be displayed, or the virtual keypad 106 may persist across many different functions of the mobile phone device 100, or may be recessed from the view but accessible with a touch. The keypad may also be arranged in a QWERTY keyboard fashion, as shown in FIG. 1A, but is not so limited. Another arrangement includes alphabetical. A further arrangement includes QWERTY with the letter keys being shared with numbers, symbols, punctuation marks, etc. In yet another approach, the keypad arrangement may be based on numbers, and thus optionally arranged numerically e.g., as on a typical telephone keypad. In addition, more or less keys may be displayed in the virtual keypad 106, including function keys, numbers, delete, tab, insert, enter, backspace, and any other keys that are typically included in desktop keyboards for personal computers and/or on a mobile telephone device.

Now referring to FIG. 1B, a second side of the mobile phone device 100 is shown according to one embodiment. The second side of the mobile phone device 100 is opposite the first side of the mobile phone device 100. The second side may include a physical keypad 110 and a second display 108. The second display may be a touchscreen display, may not respond to touch, or a combination of the two. The first and second displays 104, 108 may be of the same or different general construction. To that end, one or more of the displays may include an LCD, light emitting diodes (LEDs), organic light emitting diodes (OLEDs), etc.

According to some embodiments, the keypad 110 may include a keypad arranged in a QWERTY keyboard fashion, as shown. Of course, any other arrangement of keys is also possible, such as those described above and/or other arrangements. Each key of the keypad 110 may be slightly raised from the surface of the enclosure 102. Also, each key may produce a tangible click (sound and/or feel) such that a user can identify when the key has been depressed to produce a letter, number, symbol, etc., associated with the key.

In another embodiment, more buttons or keys may be included in addition to the keypad 110. For example, a power button 116 may be included for easier powering on and off of the mobile phone device 100. Also, an answer key 112 and a call end key 114 may be included for easy answering and ending of calls. Each key in the keypad 110 and elsewhere may include backlighting for easier identification in darkened environments. Also, each key may include more identification than the single letter or shape indicated in FIG. 1B. For example, the / key may also include a ? symbol, to indicate that by depressing the shift key (SHT), the ? function may be accessed when depressing the / key. Many other key combinations and functionality may be included in each key as would be known to one of ordinary skill in the relevant art. Further, one or more navigation controllers such as a joystick, trackball, navigation button, wheel, toggle, multidirectional pad, etc., may be present. Positioning of the additional buttons, keys, and controllers is not critical, and as such, any additional buttons, keys, and/or controllers may be positioned anywhere on the device.

According to a preferred embodiment, the keypad 110 includes one button for each letter of the American alphabet. Therefore, the keypad 110 includes at least 26 keys. More preferably, the layout of the keypad 110 resembles the layout of a standard 101-key desktop keyboard as closely as possible given the limited space on the second side of the enclosure 102. According to one embodiment, the mobile phone device 100 may include a camera 134. Also, a flash 136 may be included for illuminating objects when taking pictures with the camera 134. The camera 134 may digitally store photos and/or video on a memory of the mobile phone device 100 as would be known to one of skill in the relevant art, in any resolution, such as 1.3 megapixel (MP), 2.0 MP, 2.6 MP, 5.0 MP, etc. The flash 136 may be an LED, fluorescent, incandescent, or any other type as would be known to one of skill in the relevant art.

According to some embodiments, the total area of the first display (104, FIG. 1A) may be more than the total area of the second display (108, FIG. 1B). Preferably, the second display 108 is directly behind and facing away from the first display. Also preferably, between about 75% and 100% of the area (e.g., viewable area) of the second display 108 overlaps the area (e.g., viewable area) of the first display when viewed from a vantage point located directly in front of the second display and perpendicular to a plane of the second display, more preferably greater than about 85%, ideally greater than about 95/%.

Now referring to FIG. 1C, a left side view of a mobile phone device 100 is shown according to one embodiment. The left side of the mobile phone device 100 may include one or more switches, sockets, hatches, doors, ports, etc.

While both displays 104, 108 may operate simultaneously, it may be preferable, for reasons such as battery conservation, display longevity, etc., to activate one display at a time. Moreover, it may be desirable to disable one of the displays and/or sides of the mobile phone device 100 when the other side is being used. For example, when user input is being received via the keypad 110, the first display 104 may be disabled so as to avoid receiving inadvertent input via the touchscreen. Similarly, when the first display 104 is being used, the second display 108 and/or keyboard 110 and/or any additional input devices on the second side may be disabled so as to avoid receiving inadvertent input.

In one embodiment, the mobile phone device 100 may include a switch 118 on the exterior of the enclosure 102 for selecting operation between at least one of the first display 104 and the second display 108. For example, the switch 118 may have two or three positions, such as one for operation of the first display 104 only, one position for operation of the second display 108 only, and third position for operation of both displays simultaneously. In some embodiments, this switch 118 may also turn the mobile phone device off when in a fourth position.

In another embodiment, the mobile phone device 100 may include a sensor for detecting whether the first side or the second side of the enclosure 102 is facing upwards and/or is facing a user. Illustrative sensors include mercury switches, accelerometers, gravity sensors, thermal detectors for detecting presence of body heat, etc. In some embodiments, the mobile phone device 100 may use the sensor to determine which display is facing more upwards and/or towards the user. For example, the mobile phone device 100 may cause the first display 104 to be operational and the second display 108 to be disabled when the sensor indicates that the first display 104 is facing upwards and/or towards the user. In an alternative embodiment, the mobile phone device 100 may cause the second display 108 to be operational and the first display 104 to be disabled when the sensor indicates that the second display 108 is facing upwards and/or towards the user.

In one example, if the mobile phone device 100 is positioned such that each side is facing equally upright, then the display that was last activated may continue to be active. However, once the mobile phone device 100 is positioned in any manner in which one display is facing more upright than the other, then the more upright display may be operational while the other display may be disabled. In addition, there may be a delay included in the determination of which display is more upright, such that the mobile phone device does not jump between activating one display then the other when it is in an almost 180° orientation. Such an orientation may occur often when the mobile phone device 100 is placed in a pocket of a user, in a belt clip carrier, etc. Therefore, when the sensor is being used to determine which display is facing more upright, the user may have the option of choosing how far the mobile phone device 100 must be tilted before a disabled screen becomes active.

In another approach, a thermal sensor may detect the user's body heat facing the second side and thus activate the hardware on the second side while disabling the hardware on the first side. In operation, the device may determine that the user is positioned on a side of the device in which a thermal sensor detects the highest heat signature. Preferably, the thermal sensor is positioned on the device away from a location that is expected to be contacted or covered by a user's fingers. Moreover, each side of the device may have a thermal sensor. Illustrative positions include a top of the second side, a top corner of the first and/or second side, extending from a periphery of the housing, etc. For example, where the first side may be used in both a horizontal and vertical orientation, a corner position of the thermal sensor would avoid being covered by the fingers in most typical uses.

In a further approach, cameras may be used to detect the location of the user. Simple facial recognition schemes of a type known in the art that detects generic facial features such as face shape and eyes may be used. More complex facial recognition schemes of a type known in the art may also be used, such as those that recognize particular users. Such schemes may also be used for security functions, e.g., to allow use of the device if the user is recognized and disable at least some functionality of the device if the user is not recognized.

As an option, the active display(s) may be turned off, e.g., darkened and/or disabled, after a predetermined amount of time to conserve battery power. One or more of the displays can be reactivated upon occurrence of an event. For example, the mobile phone device 100 may activate a display based on detecting user input, e.g., selection of a key on the keypad 110 activates the second display 108, tapping on the first display 104 activates the first display 104, etc. Moreover, a display may be activated upon receiving a telephone call, e.g., to display the originating number.

As a further option, one of the displays may be set as the default for activation upon occurrence of an event. For example, upon receiving an incoming audio call or video call, the first display 104 may be activated, the display which is on a side of the mobile phone device 100 which also has a microphone 132 and/or speaker 130, etc. However, upon receiving an email, the second display 108 may be activated. In other approaches, both displays may be activated upon occurrence of the event. In a further approach, the display determined to be facing up may be activated upon occurrence of the event.

The content displayed on the first and second displays 104, 108 may be the same or different in some embodiments. In the former case, the mobile phone device 100 may show the same or portions of the same content on both displays. In another approach, user input may be received when the first display is outputting data, and the data output on the second display may include the user input or may be output as a direct result of the user input. For example, upon receiving a web address via the keypad 110 and showing the inputted characters on the second display 108, navigation may begin to the website. Upon detecting that the mobile phone device 100 has been turned over, the web page may be shown on the larger first display 104 for easier reading, viewing and/or continued navigation. Likewise, if after navigating on a website using the first display 104, a user would like to input more information, the mobile phone device 100 may be turned over again. The page is output on the second display, after optional reformatting, rescaling, etc. and additional input may be received via the keypad 110.

Page positions, cursor positions, table positions, etc., may also be maintained and shown when switching from display to display.

A similar scheme would allow browsing of emails on the larger first display 104 and composing messages on the second display 108. For example, the device may output an email program interface of the first display, and up on detecting a request to compose a new message, may open a dialogue (e.g., text, screen, window, etc.) on the second display 108 and enable the keyboard 110 for allowing composition of the message. (Note that messages may be composed using the first display as well 104 via a touch keypad 106, etc.) Moreover, functionality such as detecting selection of an email message for forwarding or replying thereto may be detected on the first display 104, which selectively or automatically opens the appropriate dialogue on the second display 108 for allowing composition of the forwarded or reply message. The user then simply turns the device over to compose the message using the keypad 110.

As noted above, in some approaches, each screen may show different content. For example, a web browser and/or application may be open on the first display 104, while an email program remains open on the second display 108.

In some embodiments, a thickness a between the first side and the second side may be less than about 0.75" (e.g., between about 0.75" and about 0.2"), more preferably less than about 0.6", even more preferably less than about 0.5" (e.g., between about 0.5" and about 0.25", between about 0.4" and about 0.25", etc.).

Figure 1D:
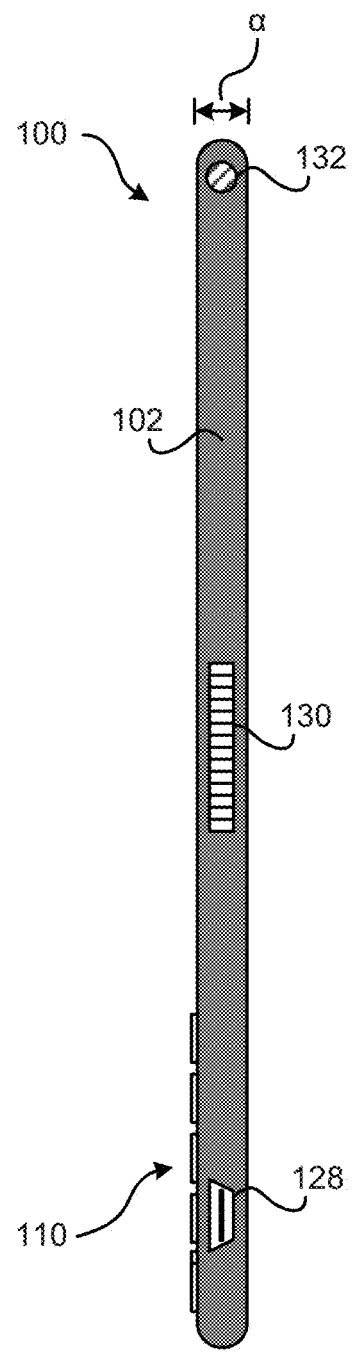
FIG. 1D depicts a right side of a mobile phone device according to one embodiment.

Now referring to FIGS. 1C and 1D, in some embodiments, the mobile phone device 100 may include a slot 126 for insertion of one or more memory devices, such as a Secure Digital (SD) card, microSD card, Memory Stick®, etc. Also, the memory device may be inserted inside of the mobile phone device 100. The mobile phone device 100 may also include internal memory in addition to the expansion memory slot 126.

In more embodiments, the mobile phone device 100 may include a battery compartment 124. Of course, a battery may also be accessible on the interior of the mobile phone device 100.

The mobile phone device 100 may also include, according to some embodiments, a USB port 122, a headphone jack 120, a speaker 130, a Firewire port 128, and/or a microphone 132. More ports and functionality may be included in the mobile phone device 100, as would be known to one of ordinary skill in the relevant art.

Figure 2:
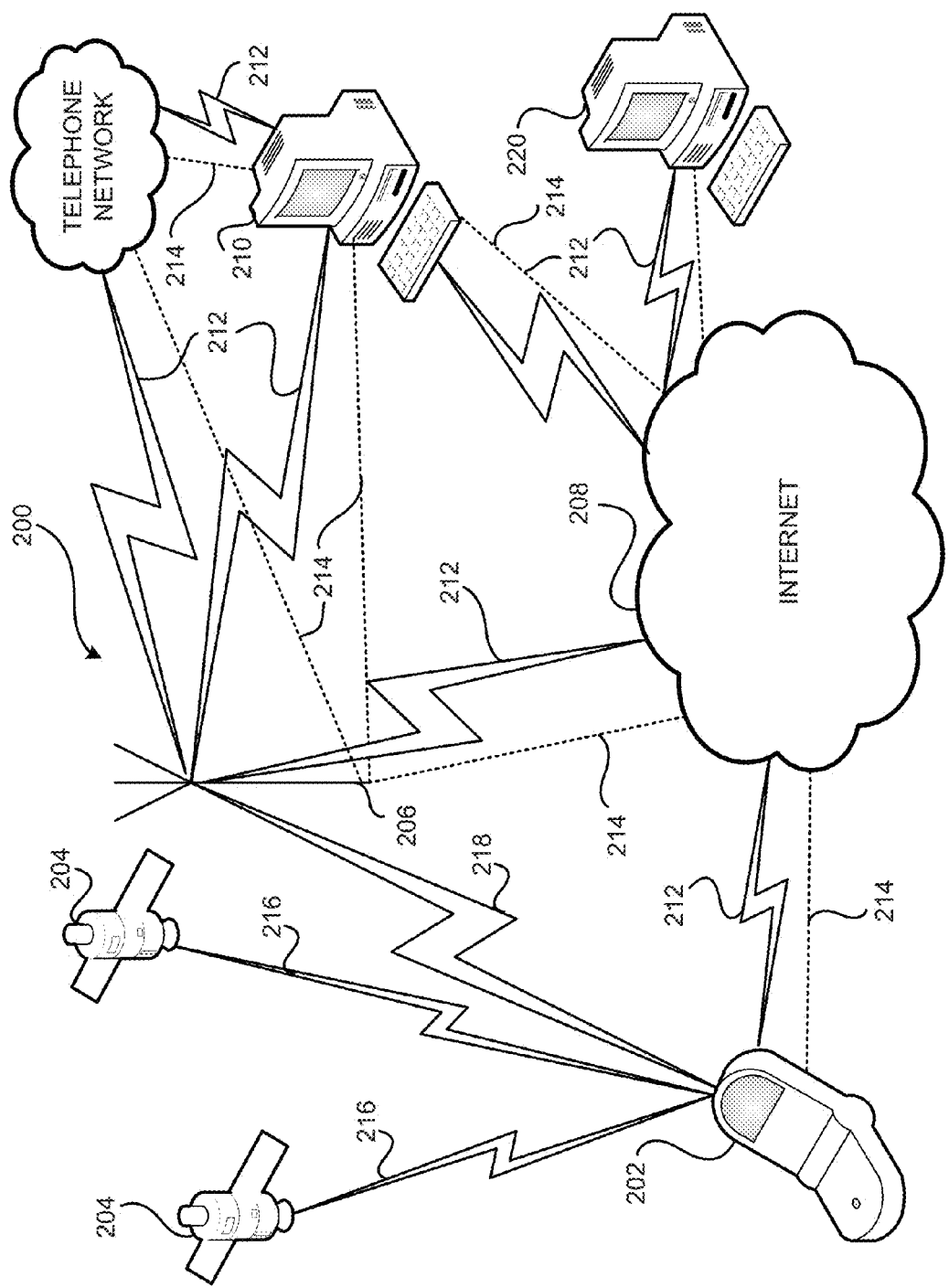
FIG. 2 depicts an environment in which the mobile phone device may be used according to one embodiment.

With reference to FIG. 2, an environment 200 in which a mobile phone device may be used is shown according to one embodiment. A mobile phone device 202, such as a mobile phone device according to one of the embodiments described herein, may connect to a telephone network 205 for communication with other mobile and terrestrial devices. The mobile phone device 202 may also connect to a server computer or switch, referred to hereinafter as server computer 210, through any number of hardwired links 214 and/or wireless links 212, 218. Generally, the mobile phone device 202 connects to a local tower 206 through a wireless connection 218, and the tower 206 connects to the telephone network 205 and/or server computer 210. Additionally, the mobile phone device 202 may connect to the internet 208 through a connection with the tower 206 and/or a server computer 210. The internet 208 may also provide a link from the mobile phone device 202 to other servers or computers 220 through wireless links 212 and/or hardwired links 214. The mobile phone device 202 may also connect via wireless links 216 to one or more satellites 204 for communication (e.g., satellite telephony) and/or location functionality (e.g., via global positioning service (GPS), etc.). In some embodiments, the mobile phone device 202 may connect to the internet via a hardwired and/or other wireless link, e.g., WiFi connection, Bluetooth® connection, etc. The program environment in which a present embodiment of the invention may be executed illustratively incorporates one or more general-purpose computers or special-purpose devices. Details of such devices (e.g., processor, memory, data storage, input and/or output devices) are well known and are omitted for the sake of clarity.

While various embodiments have been described above, it should be understood that they have been presented by way of example only, and not limitation. Thus, the breadth and scope of an embodiment should not be limited by any of the above-described exemplary embodiments, but should be defined only in accordance with the following claims and their equivalents.

What is claimed is:

1. A device, comprising:
a generally rectangular-shaped enclosure comprising:
a first side, comprising:
a first display, wherein the first display occupies between about 60 percent and about 100 percent of the first side of the device; and a second side, comprising a second display;
wherein the first side and the second side of the enclosure face different directions;
wherein the first display and the second display operate simultaneously in at least one mode of operation of the device;
wherein at least one of the first display and second display is used primarily for one or more navigation buttons;
a third side, comprising a physical switch for selecting operation between at least one of the first display and the second display; and
wherein the switch comprises at least three positions, a first position for selecting operation of the first display only, a second position for selecting operation of the second display only, and a third position for selecting simultaneous operation of the first display and the second display.

2. The device of claim 1, the second side further comprising a keypad, wherein the keypad comprises a separate button for each letter of the American alphabet.

3. The device of claim 2, wherein the keypad is arranged in a QWERTY fashion.

4. The device of claim 1, wherein the first display is a touchscreen display.

5. The device of claim 4, wherein the first display shows a keypad when text is to be entered on the device.

6. The device of claim 1, wherein a total area of the first display is larger than a total area of the second display.

7. The device of claim 1, comprising at least one sensor configured to detect whether the first display or the second display of the enclosure is facing a user, wherein the first display is operational and the second display is disabled when the sensor determines that the first display is facing upwards, wherein the second display is operational and the first display is disabled when the sensor determines that the second display is facing upwards.

8. The device of claim 1, comprising at least two thermal sensors configured to detect whether the first display or the second display of the enclosure is facing a user, wherein one of the thermal sensors is located in a corner of the first side of the device and another of the thermal sensors is located in a corner of the second side of the device.

9. The device of claim 1, comprising at least one sensor configured to detect whether the first display or the second display of the enclosure is facing a user, wherein the sensor comprises a camera, wherein the device is configured to use a facial recognition scheme to detect the user in image data received from the camera.

10. The device of claim 1, wherein the device is a mobile phone.

11. The device of claim 1, wherein a thickness of the device is less than about 0.75".

12. The device of claim 1, wherein the switch comprises a fourth position for powering the device off.

13. The device of claim 1, wherein the first display is set as a default for activation in response to receipt of an audio or video call.

14. A method, comprising:
  outputting first data on a first display of a device, wherein the first display occupies between about 60 percent and about 100 percent of a first side of the device;
  outputting second data on a second display of a device, wherein the second display is on a second side of the device, wherein the first side and the second side of the device face different directions, wherein the second side of the device comprises a keypad;
  wherein the first display and the second display operate simultaneously in at least one mode of operation of the device,
  when the first data comprises a message, receiving user input indicating a desire to forward or reply to the message; and
  in response to receiving the user input, automatically outputting a dialogue on the second display for allowing composition of a forwarded or reply message.

15. The method of claim 14, further comprising detecting, via a sensor operatively coupled to the device, whether the first display or the second display of the device is facing a user, wherein the sensor comprises a camera.

16. The method of claim 15, wherein the detecting whether the first display or the second display of the device is facing the user comprises: receiving image data from the cameral, and implementing a facial recognition scheme to detect the user from the received image data.

17. The method of claim 14, wherein the message is an email message.

18. The method of claim 14, wherein the device is a mobile phone.

* * * * *